United States Patent
Di et al.

(10) Patent No.: US 7,386,644 B2
(45) Date of Patent: Jun. 10, 2008

(54) SYSTEM FOR ADDING EXTRA CHARACTERS TO A VOCABULARY LIST OF A SELECTED CHARACTER KEY-IN METHOD IN HAND-HELD MOBILE COMMUNICATION DEVICES

(75) Inventors: Zhu-Min Di, Shanghai (CN); David Ho, Taipei (TW); Tony Tsai, Hsinchu (TW)

(73) Assignee: Inventec Appliances Corp., Taipei (TW)

( * ) Notice: Subject to any disclaimer, the term of this patent is extended or adjusted under 35 U.S.C. 154(b) by 639 days.

(21) Appl. No.: 11/038,071

(22) Filed: Jan. 21, 2005

(65) Prior Publication Data

US 2006/0168375 A1    Jul. 27, 2006

(51) Int. Cl.
G06F 13/10 (2006.01)
(52) U.S. Cl. ............................. 710/73; 710/62; 710/72; 341/106
(58) Field of Classification Search ...................... None
See application file for complete search history.

(56) References Cited

U.S. PATENT DOCUMENTS 6,765,504 B2 * 7/2004 Ouyang ........................ 341/28

2003/0063739 A1 * 4/2003 Otsuka ................... 379/433.07

FOREIGN PATENT DOCUMENTS

JP    402294769 A    * 12/1990

* cited by examiner

*Primary Examiner*—Ilwoo Park
(74) *Attorney, Agent, or Firm*—Troxell Law Office, PLLC

(57) ABSTRACT

A system to be used to add non-listed characters (i.e., characters not listed in character key-in methods) to the vocabulary banks of character-key-in methods used in hand-held mobile communication devices is disclosed. Users of a mobile communication device can select a character or characters which are built in the system but not indexed by a certain character-key-in method (that is, the characters cannot be keyed in with that character-key-in method), index the aforesaid characters, using the indexing system/method of the character-key-in method, and then add them to the key-in method's character-indexing system so that subsequent users of the mobile communication device can use said character-key-in method to key in said (originally non-indexed/listed) characters.

20 Claims, 3 Drawing Sheets

SYSTEM FOR ADDING EXTRA CHARACTERS TO A VOCABULARY LIST OF A SELECTED CHARACTER KEY-IN METHOD IN HAND-HELD MOBILE COMMUNICATION DEVICES

BACKGROUND OF THE INVENTION

1. Field of the Invention

This invention is about a system to be used to add non-indexed (and, therefore, non-listed) characters to the vocabulary bank of character-key-in methods, particularly those character-key-in methods used in hand-held mobile communication devices.

2. Description of the Prior Art

As mobile communication devices such as mobile phones, PDAs (Personal Digital Assistance) etc., become more and more popular, and manufacturers are vying with each other for customers, all kinds of value-plus, often personalized, features have been added to this little device to win the hearts of consumers. When a consumer is making a purchasing decision, the factors he must weigh include not just the price of a certain device, but compatibility and expandability of the device as well.

Presently, almost all hand-held mobile communication devices on market have built-in character-key-in methods for users to key in data or messages as needed. Generally speaking, most character-key-in methods used in mobile communication devices do not index all the characters provided by the built-in vocabulary bank stored in the memory of the device. Depending on brands and makes, the number of characters a character-key-in method can key out ranges from a few hundred to a few thousand, which is just enough for general purposes but not for special occasions and needs.

As hand-held mobile communication devices all have their character-key-in methods built in their IC memories, it is impossible for a user to add originally non-indexed characters to a certain character-key-in method. When a situation arises that requires a user to key in a character not available with a certain key-in method, his best bet is to make a make-shift key-in—choosing a substitute character that best resembles the intended one in shape, meaning, or pronunciation. This certainly is an inconvenience that a user may or may not want to live with.

DESCRIPTION OF THE INVENTION

The major aim of the present invention is to provide the user with a system that he or she can use to add non-indexed characters to the vocabulary banks of character-key-in methods used in his or her own hand-held mobile communication devices, thus solving the often encountered headache of insufficient character-key-in method vocabulary.

The invention provides a character add on system that can be used in mobile communication devices for users to select from the vocabulary bank of the mobile communication device characters not indexed in a certain character-key-in method of the mobile communication device and add these extra characters to the vocabulary of the character-key-in method, so that subsequent users may use the key-in method to key in these characters originally not indexed in the key-in method.

The mobile communication device stores in its memory a vocabulary bank, which contains a plurality of (Chinese) characters, and a number of (Chinese) character-key-in methods, each of which provides an indexing system for the a plurality, but not all, of the aforesaid characters in the vocabulary bank stored in the memory of said mobile communication devices.

The aforesaid character add-on system comprises a character selection module, an indexing module, and a correlation module. The function of said character selection module is for the user to choose from the vocabulary bank of the mobile communication device characters that he or she intends to add to a character-key-in method, while that of the indexing module is for the user to index his or her intended characters using the indexing system/method of the target character-key-in method. And, finally, the function of the correlation module is for the user to correlate the newly indexed character(s) with the target character-key-in method, so that subsequent users of the mobile communication devices can use the target character-key-in method to key out the aforesaid newly indexed characters.

The invention effectively solves the inherent problem of inadequate vocabularies found with most character-key-in methods of nearly all hand-held mobile communication devices, greatly enhancing these devices' compatibility and convenience.

DESCRIPTION OF THE PREFERRED EMBODIMENT

The invention is about a system to be used to add non-indexed (and, therefore, non-listed) characters to the vocabulary banks of character-key-in methods used in hand-held mobile communication devices. Please refer to FIG. 1. FIG. 1 illustrates how a hand-held mobile communication device incorporating the invention works. The hand-held mobile communication device 10 contains a memory 102, a display unit 104, a character key-in method selection/management module 106, and a character add on system 110. The hand-held mobile communication device may be a mobile phone, a PDA (Personal Digital Assistance), or any other portable personal communication device.

Stored in the built-in memory 102 of the hand-held mobile communication device 10 is a vocabulary bank 108 which contains a plurality of characters—each character indexed by a two digit code (as is the case with Unicode, which assigns a two digit code to each character indexed). When a hand-held mobile communication device 10 receives a message, (which is in the form of a series of codes), from an outside source, it will, via relating each code with its corresponding character in the indexed table of the vocabulary bank 108, transcript the codes into characters and upload then upload the characters into the display unit 104 for the users to view them or edit them.

When the user wants to use the hand-held mobile communication device 10 to key in or edit data, he or she will need to activate the character key-in method selection/management module 106 and choose one of the key-in methods.

There are many character key-in methods available on the market. Among them, the most popular are "Juyin" (a set of phonetic symbols used mainly in Taiwan), Strokes & Structures Method (characterizing a character according to its stroke order or physical structure), and Pinyin (Characters are coded according to their Romanized pronunciations). Each built in key-in method of the hand-held communication device 10 is assigned a "category number" in the selection/management module 106, and has its own character-indexing method/logic and a limited number of characters that correspond to its indexing codes. For example, the Juying method uses such symbols as ㄅㄆㄇㄈ (each of the symbols is, in effect, a Chinese letter, and is assigned a position on the keypad) to index its listed characters, while the Strokes & Structures Method uses strokes, radicals, and partials to do the same job. No matter what key-in methods a user may choose to use, they all share on thing in common: they don't index all the characters in the vocabulary bank in the memory of the mobile communication device. When a user encounters a character not supported by a key-in method, he or she will have to use a character-appending system such as the invention to add intended characters to the vocabulary of the chosen key-in method so that he or she may use the method to key in the intended characters.

As is shown in FIG. 1, the character-appending system 110 of the invention 10 comprises a memory 102, a display unit 104, a character key-in method selection/management module 106, an index code key in module, a storage module, and a searching module. When a user wants to add a character to a certain key-in method, he has to use an external device to transmit a set of data that contains the intended character to the mobile communication device 10 so that the intended character will be shown on the display unit of the mobile communication device 10. He can then go ahead to use the character-appending system of the invention to add the intended character to the vocabulary of the chosen key-in method.

The character key-in method selection/management module 106 will then be used to move the cursor on the display unit 104 to mark the intended character. After the intended character is marked, the index code key-in module 114 will ask the user to key in the code of the intended character as it should be keyed with the chosen character key-in method. For example, when a user wants to add the character 或 to the Ju-yin character key-in method, he has to first key in the corresponding phonetic symbol of the Ju-yin system, ㄩthe index code key-in module 114 will then generates the corresponding index code for the intended character. Depending on the indexing method of each character key-in method, the index code of a character may comprise a maximum of 8 digits.

The correlation module 106 then links the category code of the character key-in method, the index code of the intended character, and the Unicode (the norm of the industry, used to index all the characters available in the vocabulary bank of the memory) of the intended character as a string of codes, which the storage module 118 then passes to the memory 102 for later use.

After the intended character has been added to the vocabulary of a key-in method, a subsequent user can use said key-in method to key in the previously saved and stored index code, the search module 119 will then generates all the characters in the list having the same index code (*it is possible that a plurality of characters are indexed with the same one code) and upload them onto the display unit 104 for the user to pick out his intended character.

The following is a step-by-step description of the entire process of adding a non-listed character to the vocabulary of a key-in method. (Please also refer to FIG. 2.)

Step 20: Start.
Step 22: Mark the character to be added to the vocabulary of a key-in method.
Step 24: Select a key-in method.
Step 26: See if the character is already included in the vocabulary of the chosen key-in method.
Step 28: If it is not included, key in the index code of the intended character.
Step 30: Obtain the Unicode code of the intended character.
Step 32: Link the category code of the character key-in method with the index code of the intended character, and the Unicode code of the intended character as a string of codes,
Step 34: Save said string of codes to a pre-set position of the memory.
Step 36: End.

For the subsequent user who wants to key-in the newly added said character using said key-in method, the process involves an additional procedure of character search. The following is a detailed description of the procedure. Also, please refer to FIG. 3 for better understanding of the procedure Step 38: Start said search.
Step 40: Choose a character key-in method.
Step 42: Key in the index code of the intended character
Step 44: Search module 119 analyzes said index code, and then searches the vocabulary list of the chosen key-in method and the vocabulary bank of the memory 102 for the intended character.
Step 46: Upload all the characters with the same index code onto the display unit 104 for selection.
Step 48: End.

As described above, through the use of this invention, characters originally not listed in the vocabulary of a communication device's character key-in methods can now be added to said vocabulary of said key-in method for later users to use. This effectively solves the inherent problem of inadequate vocabularies found with the character-key-in methods of nearly all hand-held mobile communication devices, and greatly enhances their compatibility and convenience.

It must be said that the descriptions given above are just examples given to illustrate the embodiment of this invention. It does not necessarily follow that they are all what the invention can do, and applications of the invention shouldn't be limited, either explicit or implicit, to the statements made above.

Figure 1:
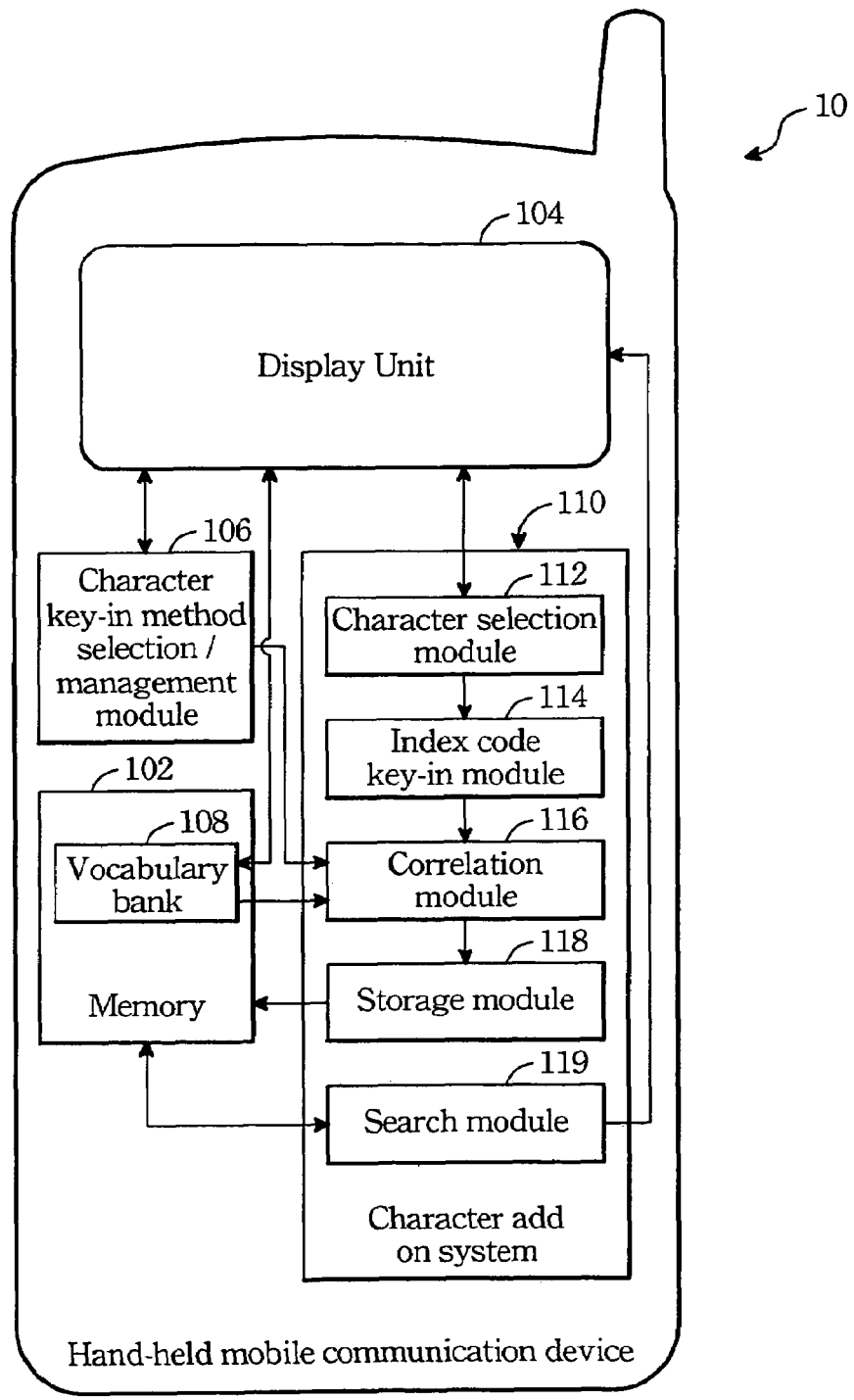
FIG. 1 illustrates how a hand-held mobile communication device incorporating said invention works.
Figure 2:
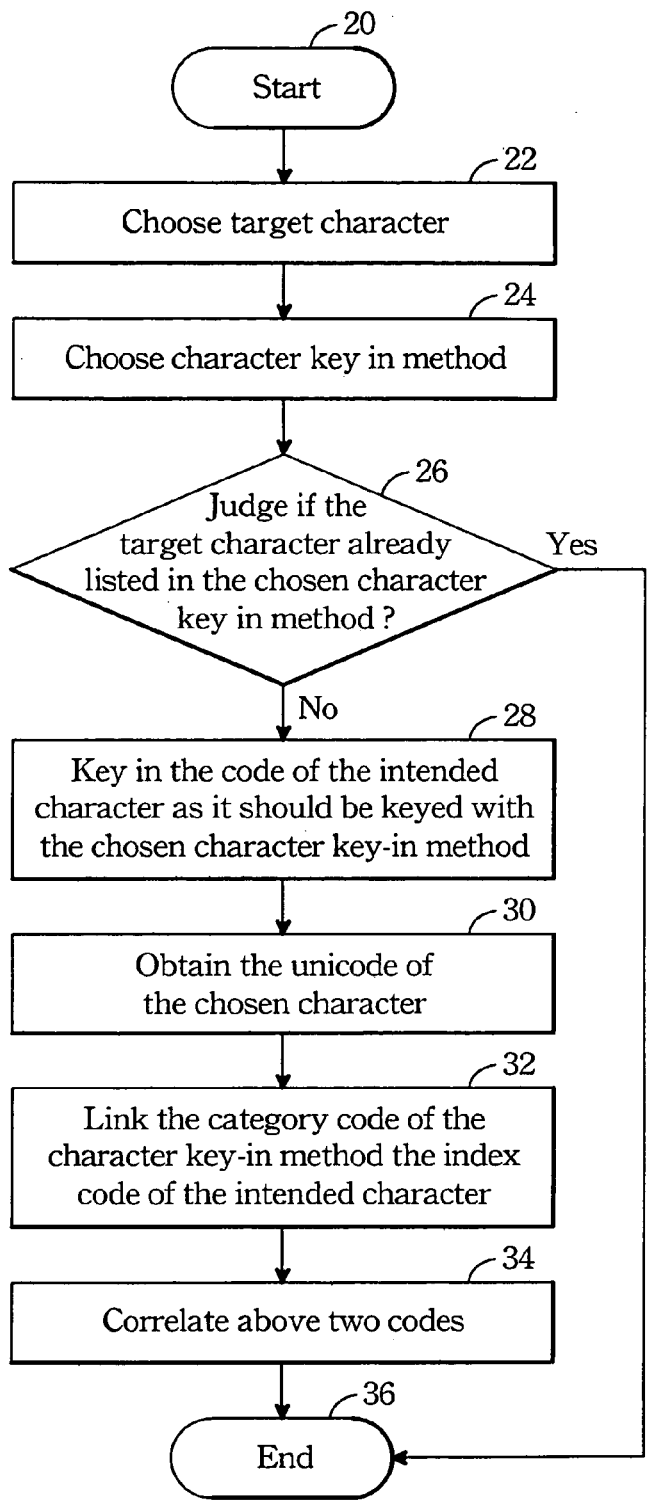
FIG. 2 illustrates how to use said invention to add a non-listed character to the vocabulary of a key-in method.
Figure 3:
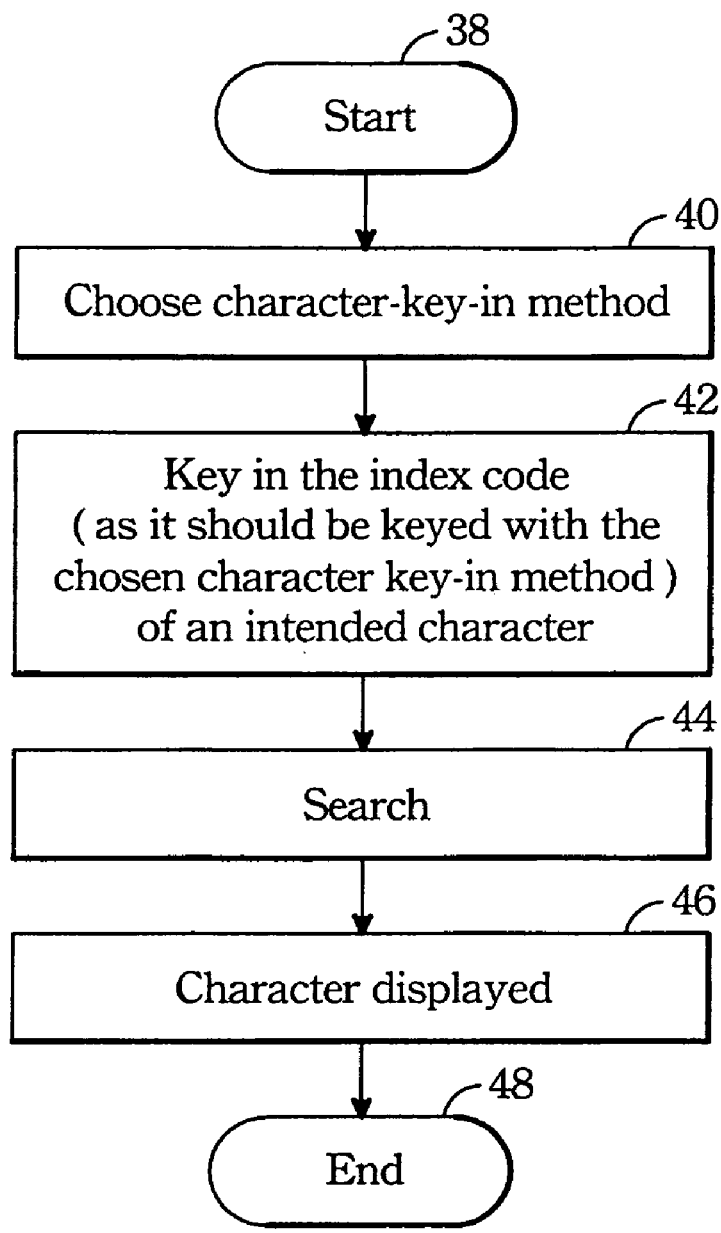
FIG. 3 shows the procedures involved searching for an intended character that has been added to a key-in method in a hand-held mobile communication incorporating said invention.

We claim:

1. A system to be used in hand-held mobile communication devices to add characters in a built-in vocabulary bank of said devices' memory to a vocabulary list of said devices' character-key-in methods' which do not contain these characters, said system comprising:
    a selection module for selecting intended characters to be added, wherein said characters are included in the built-in vocabulary bank of said devices' memory but not in the vocabulary list of said devices' character-key-in methods;
    an index code key-in module for establishing specific index codes for said intended character using an indexing/coding system of said character key-in methods; and a correlation module for a user to correlate the newly indexed/coded character(s) with said character-key-in methods, so that subsequent users of said mobile communication devices can use said character-key-in methods to key out said newly indexed/coded characters.

2. The system according to claim 1, wherein said hand-held communication devices are mobile phones.

3. The system according to claim 1, wherein said hand-held communication devices are PDAs (personal digital assistance).

4. The system according to claim 1, wherein said intended characters are chosen by the user and are picked up from the vocabulary bank of the memory of the device by said selection module.

5. The system according to claim 4, wherein said index code of said intended characters are keyed in by the user.

6. The system according to claim 5, wherein each said character key-in method is assigned a category code and is correlated by said correlation module with said index code of said intended character and the Unicode code of said intended character to form a string of codes.

7. The system according to claim 6, wherein said system further comprises a save/storage module to save/store the newly added said string of codes into the memory of said mobile communication device.

8. The system according to claim 7, wherein said system further comprising a search module, that, when a subsequent user keys in an intended character using a chosen key-in method, analyzes the index code of said character, and then searches the vocabulary list of the chosen key-in method as well as the vocabulary bank of the memory for the intended character, and then generates all the characters in the list having the same index code and uploads them onto the display unit for the user to pick out his intended character.

9. The system according to claim 1, wherein said correlation module further comprising a search table which keeps record of a plurality of index codes with their pre-set corresponding characters in order that subsequent users, using chosen key-in methods, may use the table to search out at least one character corresponding to that index code.

10. The system according to claim 1, wherein said key-in methods is selected from the group consisting of "Juyin" (a set of phonetic symbols used mainly in Taiwan), Strokes & Structures Method (characterizing a character according to its stroke order or physical structure) and Pinyin (characters are coded according to their Romanized pronunciations).

11. A method of add an intended character into a vocabulary list for a selected character-key-in method, said intended character contained in a word bank of a hand-held mobile communication device but not existed in said vocabulary list, said method comprising the step of:

establishing an index code for said intended character by using an indexing system of said character key-in method; and setting a correlate relation between said index code and said intended character by a correlation module.

12. The method according to claim 11, wherein said hand-held communication device is a mobile phone.

13. The method according to claim 11, wherein said hand-held communication device is a PDA (personal digital assistance).

14. The method according to claim 11, further comprising the step of:

choosing by user said intended characters from the vocabulary bank of the memory of the device.

15. The method according to claim 14, further comprising the step of:

selecting a category code to select a key-in method.

16. The method according to claim 15, further comprising the steps of:

correlating the category code with said index code of said intended character and the Unicode code of said intended character to form a string of codes.

17. The method according to claim 16, further comprising the steps of:

saving the newly added said string of codes into the memory of said mobile communication device.

18. The method according to claim 17, further comprising the steps of:

keying in the index code an intended character by a subsequent user using a chosen key-in method, activating the search module, which then searches the vocabulary list of the chosen key-in method as well as the vocabulary bank of the memory for the intended character, and then generates all the characters in the list having the same index code and uploads them onto the display unit for the user to pick out his intended character.

19. The method according to claim 11, wherein said correlation module uses a search table which keeps record of a plurality of index codes with their corresponding character, and that subsequent users, operating in the mode of a chosen key-in method, use the table to generate at least one character corresponding to that index code.

20. The method according to claim 11, wherein said key-in methods is selected from the group consisting of "Juyin", Strokes, Structures Method, and Pinyin.

* * * * *